Patented Feb. 20, 1945

2,369,657

UNITED STATES PATENT OFFICE 2,369,657

THIOKETONES AND PROCESS FOR PREPARING THEM

Leslie G. S. Brooker and Grafton H. Keyes, Rochester, N. Y., assignors to Eastman Kodak Company, Rochester, N. Y., a corporation of New Jersey No Drawing. Application September 13, 1940, Serial No. 356,656

20 Claims. (Cl. 260—304)

This invention relates to thioketones and to a process for preparing them.

In the copending application Serial No. 330,580, filed April 14, 1940, of Leslie G. S. Brooker and Frank L. White, (now U. S. Patent No. 2,231,659, dated February 11, 1941), halogenovinyl derivatives of the following general formula are described:

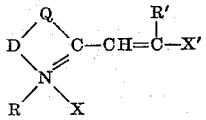

wherein D represents a phenylene or a naphthylene group, Q represents a sulfur or a selenium atom, R represents an alkyl group, R and R' each represent an aryl group, X represents an acid radical and X' represents halogen.

We have now found that halogenovinyl derivatives of the above type and related types can be converted into thioketones by treatment with thioamides. The conversion can be illustrated for the benzothiazole series as follows:

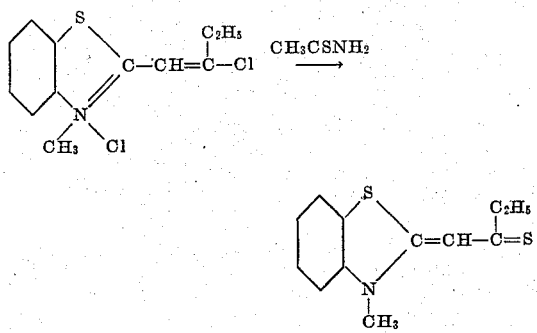

The thioketones thus obtained, sensitize photographic silver halide emulsions, we have found. Moreover, we have found that the thioketones can be converted into useful dye intermediates by treatment with alkyl salts.

It is, accordingly, an object of our invention to provide new thioketones. A further object is to provide a process for preparing such thioketones. A further object is to provide new dye intermediates and a process for preparing them. Other objects will appear hereinafter.

In accordance with our invention, we treat, with a thioamide, a compound of the following general formula:

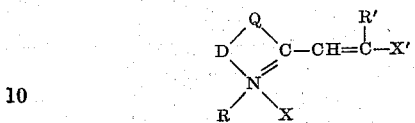

wherein D represents a phenylene or a naphthylene group, Q represents a sulfur or a selenium atom, R and R' represent alkyl or aryl groups, X represents an acid radical and X' represents halogen. The compounds wherein X represents a halide ion are advantageously employed.

As thioamides, thioacetamide, thiobenzamide and thioacetanilide are exemplary of the simpler forms. The treatment with the thioamide is advantageously carried out in the presence of a diluent, such as a lower aliphatic alcohol, like methyl, ethyl or isopropyl alcohol. Heat accelerates the reaction of the thioamide with the halogenovinyl compounds.

The following examples will serve to illustrate the manner of obtaining our new ketones. These examples are not intended to limit our invention.

*Example 1—3-methyl-2-thiopropionylmethylenebenzothiazoline*

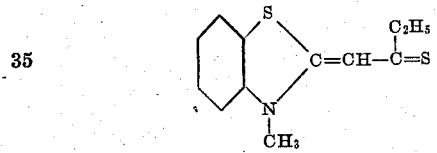

3.5 g. (1 mol.+100% excess) of thioacetamide were dissolved in 50 cc. of hot absolute ethyl alcohol. To the resulting solution, 6.4 g. (1 mol.) of 2-(2-chlorobutenyl)-benzothiazole methochloride were added. The mixture was boiled, under reflux, for 10 minutes. The solid thioketone (54% yield) was filtered off. After two recrystallizations from methyl alcohol, it was obtained as yellow crystals, melting at 158° to 160° C. with decomposition.

Example 2—3-ethyl-2-thioacetylmethylenebenzothiazoline 2.2 g. (1 mol.+100% excess) of thioacetamide were dissolved in 25 cc. of absolute ethyl alcohol by heating on a steam bath. To the resulting solution, 4.1 g. (1 mol.) of 2-(2-chloropropenyl)-benzothiazole ethochloride were added, and the mixture was boiled, under reflux, for 5 minutes. The thioketone precipitated when the reaction mixture was poured into 500 cc. of cold water. The thioketone was filtered off (yield 43%). After two recrystallizations from methyl alcohol, it was obtained as yellow needles, melting at 142° to 144° C.

Example 3—1-ethyl-2-thioacetylmethylene-β-naphthothiazoline

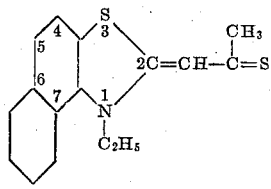

0.75 g. (1 mol.) of thioacetamide were dissolved in 30 cc. of absolute ethyl alcohol. To the resulting solution, 3.2 g. (1 mol.) of 2-(2-chloropropenyl)-β-naphthothiazole ethochloride were added. The resulting mixture was boiled, under reflux, for 5 minutes. The reaction mixture was chilled to 0° C. and the solid thioketone filtered off, and washed with methyl alcohol (68% yield). It was twice recrystallized from methyl alcohol and obtained as orange crystals, melting at 196° to 198° C. with decomposition.

Example 4—1-methyl-2-thiopropionylmethylene-β-naphthothiazoline 15 g. (1 mol.+100% excess) of thioacetamide were dissolved in 200 cc. of absolute ethyl alcohol by heating on a steam bath. 32.4 g. (1 mol.) of 2-(2-chlorobutenyl)-β-naphthothiazole methochloride were added to the solution, and the whole was refluxed for 10 minutes. After chilling to 0° C. the thioketone was filtered off and washed with 50 cc. of methyl alcohol (yield 61%). After two recrystallizations from methyl alcohol, the thioketone was obtained as orange yellow needles, melting at 203° to 206° C. with decomposition.

Example 5—3-phenyl-2-thiopropionylmethylenebenzothiazoline

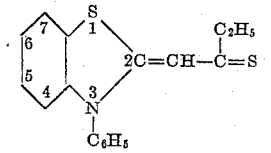

3 g. (1 mol.) of 3-phenyl-2-propionylmethylenebenzothiazoline were dissolved in dry benzene (15 cc.) and 3 g. (1 mol.+100% excess) of phosphorous oxychloride were added to the solution with stirring. The reaction mixture was allowed to stand for 2 hours. It was then diluted with 100 cc. of diethyl ether. The ether layer was decanted and the residue, 2-(2-chlorobutenyl)-benzothiazole phenochloride, was dissolved in absolute ethyl alcohol.

To the above ethyl alcoholic solution, were added 3 g. (1 mol.+100% excess) of thioacetamide. The resulting mixture was boiled, under reflux, for 20 minutes. The mixture was then cooled and poured into water. After allowing the aqueous mixture to stand overnight, the thioketone was filtered off, washed well with cold absolute ethyl alcohol. In this manner, the thioketone was obtained as a reddish-brown powder (13% yield), melting at 160° to 165° C.

The 3-phenyl-2-propionylmethylene benzothiazoline employed above was prepared as follows: 7.0 (1 mol.) of 2-methyl-3-phenylbenzothiazolium iodide were dissolved in 15 cc. of dry pyridine, the solution cooled to 0° C. and 2.5 g. (1 mol.+25% excess) of propionyl chloride were added dropwise to the cooled solution. The reaction mixture was allowed to stand 15 minutes at 0° C., then 15 minutes at 20° to 25° C., and finally 15 minutes on the steam-pot. The pyridine was removed from the resulting mixture, by warming on the steam-pot, under reduced pressure. The residue was poured into ice water and the mixture allowed to stand overnight. The aqueous layer was decanted and the oily residue was extracted with 50 cc. of hot ligroin (boiling point, 90° to 120° C.). The 3-phenyl-2-propionylmethylenebenzothiazoline separated from the cooled ligroin, in 53% yield, as a viscous mass which did not crystallize.

The 2-methyl-3-phenylbenzothiazolium iodide employed above can be prepared as described in the copending application of Leslie G. S. Brooker and William Waldo Williams, Serial No. 353,500, filed August 21, 1940, now United States Patent 2,330,203, dated September 28, 1943, or as described in the copending application of Leslie G. S. Brooker and Homer W. J. Cressman, Serial No. 353,502, filed August 21, 1940, now United States Patent 2,317,357, dated April 27, 1943.

Example 6—2-thioacetylmethylene-3,4-trimethylenebenzothiazoline

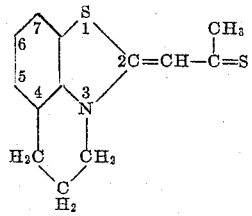

3.2 g. (1 mol.) of 2-acetylmethylene-3,4-trimethylenebenzothiazoline were suspended in 50 cc. of dry benzene. To this suspension were added dropwise, with stirring, at 20° to 25° C., 3.2 g. (1.5 mol.) of phosphorous oxychloride. Heat was evolved. The hot reaction mixture, occasionally stirred, was allowed to stand at 20° to 25° C. for 15 minutes. The mixture was then chilled to 0° C. and the solid product, 2-(2-chloropropenyl)-3,4-trimethylenebenzothiazolium chloride, was filtered off, washed well with dry diethyl ether.

The above washed product was then added to a hot solution of 2.08 g. (1 mol.+100% excess) of thioacetamide dissolved in 20 cc. of absolute ethyl alcohol. The resulting mixture was heated on a steam bath for 15 minutes. The thioketone separated from the hot reaction mixture. The reaction mixture was chilled to 0° C. and the thioketone filtered off, washed with cold methyl alcohol and dried in the air (yield 84%). After two recrystallizations from methyl alcohol, the thioketone was obtained as golden yellow needles, melting at 207° to 208° C. with decomposition.

The 2-acetylmethylene-3,4-trimethylenebenzothiazoline employed above was prepared as follows: 5.0 g. (1 mol.) of 2-methyl-3,4-trimethylenebenzothiazolium iodide were placed in 50 cc. of dry pyridine. The mixture was chilled to 0° C. To the chilled mixture were added dropwise, over a ten-minute period, with stirring, 1.86 g. (1.5 mol.) of acetyl chloride. The mixture was stirred for 5 minutes in the cold, allowed to stand at 20° to 25° C. for 30 minutes, and finally heated on a steam bath for another 30 minutes. The pyridine and excess acetyl chloride were mostly removed by heating on a steam bath under reduced pressure. The residue was poured into 100 cc. of ice water. The oily product slowly solidified. The solid was filtered off, washed with water and dried in the air. This crude material was repeatedly extracted with 150 cc. portions of ligroin (boiling point 70° to 90° C.), as long as crystalline material separated from the ligroin extracts upon chilling to 0° C. In this manner, the 2-acetylmethylene-3,4-trimethylenebenzothiazoline was obtained, in 30% yield, as a nearly colorless solid, melting at 165° to 167° C.

The 2-methyl-3,4-trimethylenebenzothiazolium iodide employed above can be prepared as described in the copending application of Leslie G. S. Brooker and Homer W. J. Cressman, Serial No. 353,502, filed August 21, 1940, now United States Patent 2,317,357, dated April 27, 1943).

*Example 7—5-chloro-3-methyl-2-thiopropionyl-methylene-benzoselenazoline*

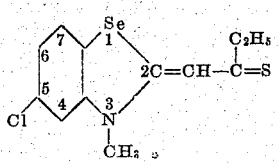

5 g. (1 mol.) of 5-chloro-3-methyl-2-propionyl-methylene-benzoselenazoline were suspended in 50 cc. of dry benzene. To the resulting suspension, were added 3.7 g. (1.5 mol.) of phosphorous oxychloride, with stirring. The reaction mixture first became sticky, and upon further stirring, finally became crystalline. The chlorovinyl compound thus obtained was collected upon a filter and washed with diethyl ether. The washed chlorovinyl intermediate was incorporated in 100 cc. of boiling absolute ethyl alcohol along with 2.5 g. (2 mol.) of thioacetamide. Boiling, under reflux, was continued for 5 minutes. The thioketone separated from the hot reaction mixture. After chilling, the thioketone was collected on a filter, washed well with water, cold ethyl alcohol and then dried. In this manner, 3 g. (50% yield) of substantially pure thioketone was obtained. After two recrystallizations from methyl alcohol (500 cc. per gram of ketone), it was obtained as brownish needles, melting at 194° to 196° C.

In a manner similar to that illustrated in the above examples, 2-(β-chloro-β-phenylvinyl)-benzothiazole methochloride and 2-(β-chloro-β-furylvinyl)-benzothiazole methochloride can be converted into thioketones.

In practicing our invention, we have found it advantageous to employ the thioamide in excess; from one and one-half to two and one-half molecular proportions of thioamide for each molecular proportion of halogenovinyl derivative being especially useful.

From our new thioketones, valuable dye intermediates can be prepared by treating the thioketones with alkyl salts. The reaction, for the benzothiazole series, can be illustrated as follows:

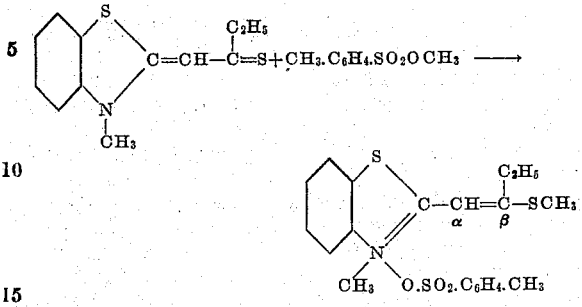

The following examples illustrate the formation of dye intermediates by our new process and the formation of dyes from such intermediates. These examples are not intended to limit our invention.

*Example 8—2-(2-methylmercapto-1-butenyl)-benzothiazole metho-p-toluenesulfonate*

4.7 g. (1 mol.) of 3-methyl-2-thiopropionyl-methylene-benzothiazoline and 3.8 g. (1 mol.) of methyl-p-toluenesulfonate were heated together on a steam bath for one hour. The resulting viscous mass was essentially dye intermediate.

A carbocyanine dye was formed from this dye intermediate by dissolving the viscous mass in 25 cc. of absolute ethyl alcohol, adding 6.5 g. (1 mol.) of 2-methyl-β-naphthoxazole methiodide and 2 g. (1 mol.) of triethylamine, and boiling the whole for 15 minutes, under reflux. The reaction mixture was cooled and the dye filtered off and recrystallized from methyl alcohol. It was obtained as a dull reddish powder, melting at 245° to 246° C. with decomposition. It sensitized a photographic gelatino-silver-bromiodide emulsion to 600 mu with a maximum at 630 mu.

*Example 9—2-(2-methylmercaptopropenyl)-β-naphthothiazole metho-p-toluenesulfonate*

1.4 g. (1 mol.) of 1-ethyl-2-thioacetylmethylene-β-naphthothiazoline having the following formula

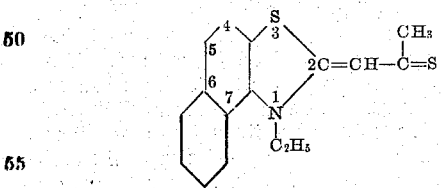

and 1.0 g. (1 mol.) of methyl-p-toluenesulfonate were heated together on a steam bath for 15 minutes. The solid mass of crystals which formed was essentially dye intermediate.

A dye was formed from the foregoing dye intermediate by dissolving the mass of crystals in 20 cc. of absolute ethyl alcohol, adding 1.35 g. (1 mol.) of 2,4-dimethylthiazole ethiodide and 1 g. (2 mol.) of triethylamine, and boiling the whole under reflux for 20 minutes. The reaction mixture was chilled and diluted with 50 cc. of diethyl ether. The dye was filtered off, washed with water and acetone and finally dried in the air (yield 13%). After two recrystallizations from methyl alcohol, the dye was obtained as minute reddish crystals, melting at 233° to 235° C. with decomposition. The dye was 3,3'-diethyl-4',9-dimethyl-4,5-benzothiathiazolocarbocyanine iodide.

*Example 10—2-(2-methylmercaptopropenyl)-3,4-trimethylene-benzothiazolium-p-toluenesulfonate*

2.1 g. (1 mol.) of 2-thioacetylmethylene-3,4-trimethylene-benzothiazoline and 2.34 (1.5 mol.) were thoroughly mixed together and the mixture heated on the steam bath for one hour. The cooled reaction mixture was stirred in 75 cc. of dry diethyl ether. The solid product which was filtered off was essentially dye intermediate.

The above dye intermediate was employed to prepare a carbocyanine dye as follows: 0.87 g. (1 mol.) of the intermediate, 1.15 g. (2 mol.) of 2-methylbenzoxazole ethiodide and 0.4 g. (2 mol.) of triethylamine were dissolved in 20 cc. of absolute ethyl alcohol. The mixture was boiled under reflux for 20 minutes. Upon cooling the reaction mixture, the dye separated out. It was filtered off, washed with water and then with methyl alcohol (25% yield). After two recrystallizations from methyl alcohol (200 cc. per gram of dye), the dye was obtained as reddish-purple needles, melting at 249° to 251° C. with decomposition. The dye was 3-ethyl-9-methyl-3',4'-trimethyleneoxathiacarbocyanine iodide, and sensitized a gelatino-silver-bromiodide emulsion strongly out to about 600 mu with a maximum at about 550 mu.

In a similar manner, 3-ethyl-9-methyl-3',4'-trimethylene-6,7-benzoxathiacarbocyanine iodide was obtained from the above intermediate and 2-methyl-α-naphthoxazole ethiodide, as red crystals, melting at 256° to 257° C. with decomposition. The dye sensitized a gelatinosilver-bromiodide emulsion moderately strongly to 600 mu with a maximum at about 570 mu.

*Example 11—2-(2-methylmercaptopropenyl)-benzothiazole etho-p-toluenesulfonate*

0.5 g. (1 mol.) of 2-thioacetylmethylene-3-ethylbenzothiazoline and 0.4 g. (1 mol. +10% excess) of methyl-p-toluenesulfonate were mixed together and heated on a steam bath for 30 minutes. The reaction mass was essentially dye intermediate.

A carbocyanine dye was prepared from the above dye intermediate by dissolving it in 10 cc. of absolute ethyl alcohol, along with 0.7 g. (1 mol.) of 2-methyl-3-phenylbenzothiazolium iodide and 0.2 g. (1 mol.) of triethylamine. The mixture was boiled, under reflux, for 15 minutes. The reaction mixture was then cooled and diluted with diethyl ether to precipitate the dye. The liquid was decanted from the ethereal mixture, and the residue was recrystallized from 60 cc. of absolute ethyl alcohol (yield 50%). The dye was further twice recrystallized from absolute ethyl alcohol (100 cc. per gram of dye) and obtained as green plates, melting at 246° to 248° C. with decomposition (36% yield). The dye sensitized a photographic silver bromiodide emulsion to 630 mu with maxima at about 530 mu and about 575 mu. The dye was 3-ethyl-9-methyl-3'-phenylthiacarbocyanine iodide.

*Example 12—2-(2-methylmercapto-1-butenyl)-benzothiazole pheno-p-toluenesulfonate*

0.4 g. (1 mol.) of 3-phenyl-2-thiopropionylmethylene benzothiazoline and 0.3 g. (1 mol. +10% excess) of methyl-p-toluenesulfonate were heated together upon the steam bath for one hour. The reaction mass was essentially dye intermediate.

A carbocyanine dye was prepared from the dye intermediate by dissolving the above mass in 10 cc. of absolute ethyl alcohol, adding 0.5 g. (1 mol.) of 2-methyl-3-phenylbenzothiazolium iodide and 0.2 g. (1 mol.) of triethylamine, and boiling the whole, under reflux, for 15 minutes. The reaction mixture was cooled and diluted with diethyl ether to precipitate the dye. The dye, 9-ethyl-3,3'-diphenylthiacarbocyanine iodide, was thrice recrystallized from absolute ethyl alcohol and obtained as greenish-yellow needles, melting at 257° to 258° C. with decomposition (yield 44%). The dye sensitized a photographic gelatino-silver-bromiodide emulsion to 635 mu with a maximum at 590 mu.

*Example 13—5-chloro-2-(2-methylmercapto-1-butenyl)-benzoselenazole metho-p-toluenesulfonate*

0.75 g. (1 mol.) of 5-chloro-3-methyl-2-thiopropionyl-methylenebenzothiazoline and 0.5 g. (1 mol.) of methyl-p-toluene-sulfonate were heated together at the temperature of a steam bath for about one hour. This gave a viscous mass which was essentially all dye intermediate.

A carbocyanine dye was prepared from the above dye intermediate in the following manner: the dye intermediate was dissolved in 10 cc. of absolute ethyl alcohol. To the resulting solution was added an absolute ethyl alcoholic solution (10 cc.) of 5-chloro-2-methylbenzoselenazole metho-p-toluenesulfonate, prepared by heating together 0.6 g. (1 mol.) of 5-chloro-2-methylbenzoselenazole and 0.35 g. (1 mol.) of methyl-p-toluenesulfonate on the steam bath for 3 hours. To the resulting solution were added 0.5 g. (2 mol.) of triethylamine. The resulting mixture was boiled under reflux for 15 minutes. The reaction mixture was then chilled, the dye which separated collected on a filter, washed with water (25 cc.), acetone (20 cc.) and finally dried in the air. The dye was then dissolved in hot methyl alcohol, and an excess of aqueous potassium bromide was added. Upon cooling the dye bromide separated out. It was filtered off and twice recrystallized from methyl alcohol, and obtained as dark, coppery crystals, melting at 263° to 265° C. with decomposition. The dye sensitized a photographic gelatino-silver-bromiodide emulsion to 700 mu with a maximum at about 650 mu.

What we claim as our invention and desire to be secured by Letters Patent of the United States is:

1. A thioketone of the following formula:

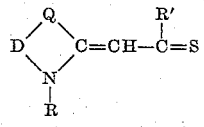

wherein D represents an organic radical selected from the group consisting of phenylene and naphthylene groups, Q represents an atom selected from the group consisting of sulfur and selenium atoms and R and R' represent organic radicals selected from the group consisting of alkyl and aryl groups.

2. A thioketone of the following formula:

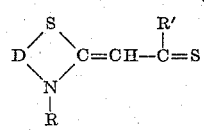

wherein D represents an organic radical selected from the group consisting of phenylene and naphthylene groups and R and R' represent organic radicals selected from the group consisting of alkyl and aryl groups.

3. A thioketone of the following formula:

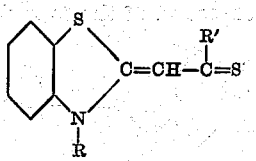

wherein R and R' each represent an alkyl group.

4. A thioketone of the following formula:

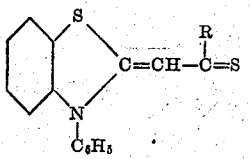

wherein R represent an alkyl group.

5. A process for preparing a thioketone comprising treating, with a thioamide, a compound of the following formula:

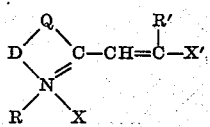

wherein D represents an organic radical selected from the group consisting of phenylene and naphthylene groups, Q represents an atom selected from the group consisting of sulfur and selenium atoms, R and R' represent organic radicals selected from the group consisting of alkyl and aryl groups, X represents an acid radical and X' represents halogen.

6. A process for preparing a thioketone comprising treating, with a thioamide, a compound of the following formula:

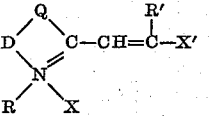

wherein D represents an organic radical selected from the group consisting of phenylene and naphthylene groups, Q represents an atom selected from the group consisting of sulfur and selenium, R and R' represent organic groups selected from the group consisting of alkyl and aryl groups, X represents a halide ion, and X' represents halogen.

7. A process for preparing a thioketone comprising treating, with a thioamide, a compound of the following formula:

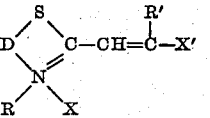

wherein D represents an organic radical selected from the group consisting of phenylene and naphthylene groups, R and R' each represent alkyl groups, X represents a halide ion, and X' represents halogen.

8. A process for preparing a thioketone comprising treating, with a thioamide, a compound of the following formula:

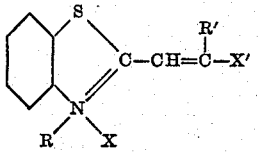

wherein R and R' each represent alkyl groups, X represents a halide ion, and X' represents halogen.

9. A process for preparing a thioketone comprising treating, with a thioamide, a compound of the following formula:

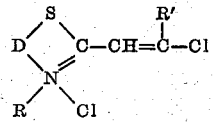

wherein D represents an organic radical selected from the group consisting of phenylene and naphthylene groups, and R and R' each represent alkyl groups.

10. A process for preparing a thioketone comprising treating, with a thioamide, a compound of the following formula:

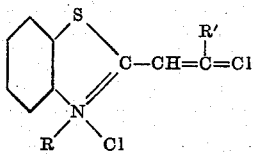

wherein R and R' each represent an alkyl group.

11. A process for preparing a thioketone comprising treating, with a thioamide, a compound of the following formula:

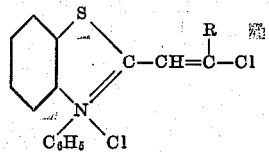

wherein R represents an alkyl group.

12. A process for preparing a thioketone comprising treating, with thioacetamide, a compound of the following formula:

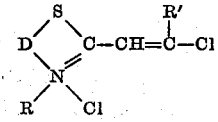

wherein D represents an organic radical selected from the group consisting of phenylene and naphthylene groups, and R and R' each represent alkyl groups.

13. A process for preparing a thioketone comprising treating, with thioacetamide, a compound of the following formula:

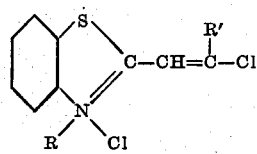

where R and R' each represent alkyl group.

14. A process for preparing a thioketone comprising treating, with thioacetamide, a compound of the following formula:

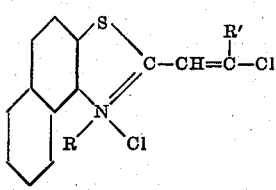

wherein R and R' each represent alkyl groups.

15. A process for preparing a thioketone comprising treating with thioacetamide, a compound of the following formula:

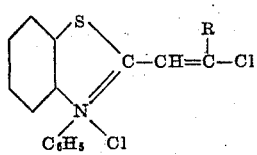

wherein R represents an alkyl group.

16. A process for preparing a dye intermediate comprising treating, with an alkyl salt, a thioketone of the following formula:

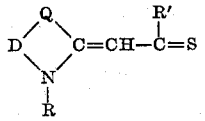

wherein D represents an organic radical selected from the group consisting of phenylene and naphthylene groups, Q represents an atom selected from the group consisting of sulfur and selenium and R and R' each represent an organic radical selected from the group consisting of alkyl and aryl groups.

17. An azole thioketone of the formula:

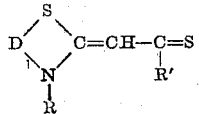

wherein D is a radical taken from the group consisting of phenylene and naphthylene radicals and R and R' are alkyl radicals.

18. The compound of the formula:

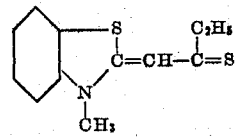

19. The compound of the formula:

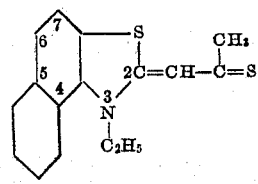

20. The compound of the formula:

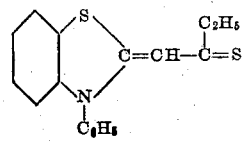

LESLIE G. S. BROOKER.
GRAFTON H. KEYES.